(12) United States Patent
Tang

(10) Patent No.: US 12,424,037 B2
(45) Date of Patent: Sep. 23, 2025

(54) LOCK SYSTEM, METHOD, AND COMPUTER PROGRAM BASED ON GESTURE DETECTION

(71) Applicant: Junyang Tang, Brooklyn, NY (US)

(72) Inventor: Junyang Tang, Brooklyn, NY (US)

( * ) Notice: Subject to any disclaimer, the term of this patent is extended or adjusted under 35 U.S.C. 154(b) by 92 days.

(21) Appl. No.: 18/520,590

(22) Filed: Nov. 28, 2023

(65) Prior Publication Data
US 2025/0174060 A1    May 29, 2025

(51) Int. Cl.
*G07C 9/00* (2020.01)
*G01P 15/14* (2013.01)
*G06F 3/01* (2006.01)

(52) U.S. Cl.
CPC .......... *G07C 9/00174* (2013.01); *G01P 15/14* (2013.01); *G06F 3/017* (2013.01)

(58) Field of Classification Search
CPC ......... E05B 37/00; E05B 37/002; G07C 9/00; G07C 9/00174; G01C 19/00; G01P 15/00; G01P 15/001; G01P 15/034; G01P 15/036; G01P 15/0888; G01P 15/0891; G01P 15/14; G01P 15/16; G01P 15/165; G06F 3/017
USPC .......................................................... 70/277
See application file for complete search history.

(56) References Cited

U.S. PATENT DOCUMENTS

| | | | |
|---|---|---|---|
| 7,657,849 B2* | 2/2010 | Chaudhri | G06F 3/0488 345/173 |
| 2020/0070777 A1* | 3/2020 | Chen | G06F 3/017 |
| 2022/0137204 A1* | 5/2022 | Nguyen | G08C 17/02 342/28 |
| 2022/0261066 A1* | 8/2022 | Dryer | G06F 3/04845 |
| 2022/0374085 A1* | 11/2022 | Nguyen | G06F 1/1684 |
| 2022/0413596 A1* | 12/2022 | Seger, Jr. | G06F 3/0227 |
| 2023/0132451 A1* | 5/2023 | Makker | G06F 3/16 704/275 |
| 2023/0149805 A1* | 5/2023 | Argiro | A63F 13/428 463/31 |
| 2023/0186870 A1* | 6/2023 | Cristache | H04W 12/68 345/204 |

(Continued)

*Primary Examiner* — Nathan Cumar
(74) *Attorney, Agent, or Firm* — Yue (Robert) Xu

(57) ABSTRACT

This application provides a solution for a lock system based on gesture detection. In this solution, the lock system includes an angular acceleration sensor, an acceleration sensor, a processor, a drive motor, and a lock. During the unlocking process, firstly, in response to the movement of the user's hand, the angular acceleration sensor detects a series of angular acceleration values; in response to the movement of the user's hand, the acceleration sensor detects a series of acceleration values. Then, the processor receives a series of angular acceleration values and a series of acceleration values; the processor converts the received series of angular acceleration values and a series of acceleration values into a first data sequence and a second data sequence respectively; the processor converts the first data sequence and the second data sequence. The data sequence is combined into a third data sequence. Finally, the processor determines the difference between the third data sequence and the preset reference data sequence; when the difference is less than the preset threshold, the processor controls the drive motor to open the lock.

8 Claims, 2 Drawing Sheets

(56) References Cited

U.S. PATENT DOCUMENTS

| | | | |
|---|---|---|---|
| 2023/0245657 A1* | 8/2023 | Liang | G10L 15/1815 704/243 |
| 2023/0273985 A1* | 8/2023 | Suchan | G06F 3/017 726/18 |
| 2023/0343200 A1* | 10/2023 | Carrigan | G06F 1/3265 |
| 2023/0356728 A1* | 11/2023 | Jain | G06F 3/013 |
| 2023/0376193 A1* | 11/2023 | Han | G06F 3/0488 |

* cited by examiner

LOCK SYSTEM, METHOD, AND COMPUTER PROGRAM BASED ON GESTURE DETECTION

FIELD

The present disclosure relates to lock systems, and more particularly to a lock system, a method, and a computer program based on gesture detection.

BACKGROUND OF THE INVENTION

Currently, locks opened with keys can be violently broken. In addition, if a user forgets to bring the key, the user cannot enter the door normally. On the other hand, locks using digital passwords may also affect security if the digital password is cracked.

SUMMARY OF THE INVENTION

Embodiments of the present disclosure provide lock systems, methods and computer programs based on gesture detection.

In a first aspect of the present disclosure, the present disclosure provides a lock system based on gesture detection. The lock system includes an angular acceleration sensor, an acceleration sensor, a processor, a driving motor and a lock. In response to the movement of the user's hand, the angular acceleration sensor detects a series of angular acceleration values; in response to the movement of the user's hand, the acceleration sensor detects a series of acceleration values; the processor receives the series of angular acceleration values and the series of acceleration values; the processor converts the received series of angular acceleration values and the series of acceleration values into a first data sequence and a second data sequence respectively; the processor combines the first data sequence and the second data sequence into a third data sequence; the processor determines the difference between the third data sequence and a preset reference data sequence; when the difference is less than a preset threshold, the processor controls the drive motor to open the lock.

In a second aspect of the present disclosure, a control method based on gesture detection is provided. The method includes receiving a series of angular acceleration values detected by an angular acceleration sensor in response to an action of a user's hand and a series of acceleration values detected by an angular acceleration sensor in response to an action of the user's hand; converting the received series of angular acceleration values and the series of acceleration values into a first data sequence and a second data sequence respectively; and combining the first data sequence and the second data sequence into a third data sequence; determining the difference between the third data sequence and the preset reference data sequence; when the difference is less than the preset threshold, controlling the drive motor to open the lock.

In a third aspect of the present disclosure, there is provided a computer program product tangibly stored on a non-transitory computer-readable medium and including machine-executable instructions that, when executed, the machine is caused to perform the method of the second aspect of the present disclosure.

This Summary is provided to introduce a selection of concepts in a simplified form that are further described below in the Detailed Description. This Summary is not intended to identify key features or key features of the disclosure, nor is it intended to limit the scope of the disclosure.

BRIEF DESCRIPTION OF DRAWINGS

The above and other objects, features and advantages of the present disclosure will become more apparent by describing the exemplary embodiments of the present disclosure in more detail with reference to the accompanying drawings, wherein, in the exemplary embodiments of the present disclosure, the same reference numerals generally represent Same parts.

DETAILED DESCRIPTION OF THE INVENTION

Figure 1:
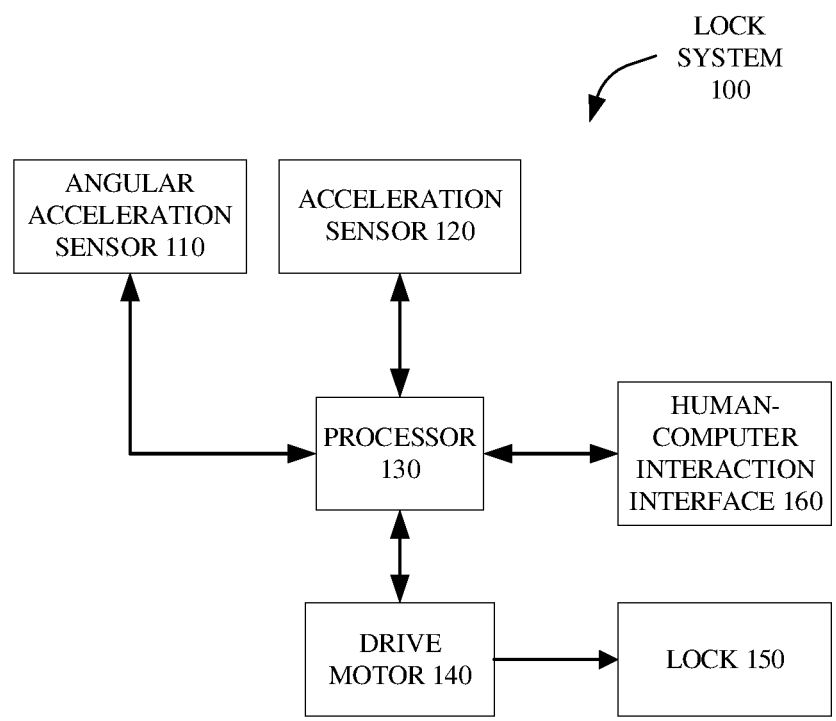
FIG. 1 illustrates a block diagram of a lock system in accordance with an embodiment of the present disclosure.

Preferred embodiments of the present disclosure will be described in more detail below with reference to the accompanying drawings. Although the preferred embodiments of the present disclosure are shown in the drawings, it should be understood that the present disclosure may be implemented in various forms and should not be limited to the embodiments set forth herein. Rather, these embodiments are provided so that this disclosure will be thorough and complete, and will fully convey the scope of the disclosure to those skilled in the art.

As used herein, the term "include" and its variations mean an open inclusion, ie, "including but not limited to." Unless otherwise stated, the term "or" means "and/or". The term "based on" means "based at least in part on." The terms "one example embodiment" and "an embodiment" mean "at least one example embodiment." The term "another embodiment" means "at least one additional embodiment". The terms "first," "second," etc. may refer to different or the same object. Other explicit and implicit definitions may be included below.

Currently, locks opened with keys can be violently broken. In addition, if the user forgets to bring the key, the user cannot enter the door normally. On the other hand, locks using digital passwords may also affect security if the digital password is cracked.

In order to at least partially solve the above problems and other potential problems, example embodiments of the present disclosure provide a lock system based on gesture contrast detection. The solution of the present disclosure utilizes human body gestures in the password setting stage and the password using stage, which not only improves the intelligence of the door lock, but also improves the security of the door lock.

FIG. 1 shows a block diagram of a lock system 100 in accordance with an embodiment of the present disclosure. It should be understood that the structure and functionality of the lock system 100 are described for illustrative purposes only and are not intended to imply any limitation on the scope of the present disclosure. That is, certain components in the lock system 100 may be omitted or replaced, and other components not shown may be added to the lock system 100. Embodiments of the present disclosure may be embodied in different structures and/or functions.

As shown in FIG. 1, the lock system 100 includes an angular acceleration sensor 110, an acceleration sensor 120, a processor 130, a driving motor 140 and a lock 150. In response to the movement of the user's hand, the angular acceleration sensor 110 detects a series of angular acceleration values. In response to the movement of the user's hand, the acceleration sensor 1 20 detects a series of acceleration values. The processor 130 receives a series of angular acceleration values and a series of acceleration values. The processor 130 converts the received series of angular acceleration values and the series of acceleration values into a first data sequence and a second data sequence respectively. The processor 130 combines the first data sequence and the second data sequence into a third data sequence. The processor 130 determines the difference between the third data sequence and the preset reference data sequence. When the difference is less than the preset threshold, the processor 130 controls the driving motor 140 to open the lock 150.

In some embodiments, the angular acceleration sensor 110 is a gyroscope, and the acceleration sensor 120 is a three-dimensional accelerometer. The user holds a gyroscope and draws a series of movements in the air to obtain a series of angular acceleration values. The user holds a three-dimensional accelerometer in his hand and draws a series of movements in the air to obtain a series of acceleration values. The angular displacement array can be obtained by integrating the series of angular acceleration values, and the displacement array can be obtained by integrating the series of acceleration values.

In some embodiments, the processor 130 determines the difference between the third data sequence and the preset reference data sequence including calculating a variance between the third data sequence and the reference data sequence. Since the third data sequence and the reference data sequence can be set as functions relative to time, the difference probability of the two functions can be calculated using variance.

In some embodiments, when the variance is less than the preset variance threshold, the processor 1 30 controls the drive motor 140 to open the lock 150. If the variance is less than the threshold, it means that the user's gestures during the password setting stage and the actual unlocking stage are close, and the password can be judged to be correct. If the variance is greater than the threshold, it means that the user's gesture password has not been entered correctly and the door lock is not allowed to be opened at this time. In some embodiments, electromagnetic door locks may also be used.

the movement of the user's hand, the angular acceleration sensor 110 detects the first series of angular acceleration values; in response to the movement of the user's hand, the acceleration sensor 120 detects out the first series of acceleration values; the processor 130 receives the first series of angular acceleration values and the first series of acceleration values; the processor 130 converts the received first series of angular acceleration values and the first series of acceleration values into fourth data respectively. sequence and the fifth data sequence; the processor 130 combines the fourth data sequence and the fifth data sequence into a reference data sequence. In this embodiment, the user sets a password for the door lock.

In some embodiments, the lock system 100 also includes a human-computer interaction interface 160. The human-computer interaction interface 160 can be used to prompt gesture information to the user. The human-computer interaction interface also provides other types of unlocking methods, such as face recognition unlocking.

Figure 2:
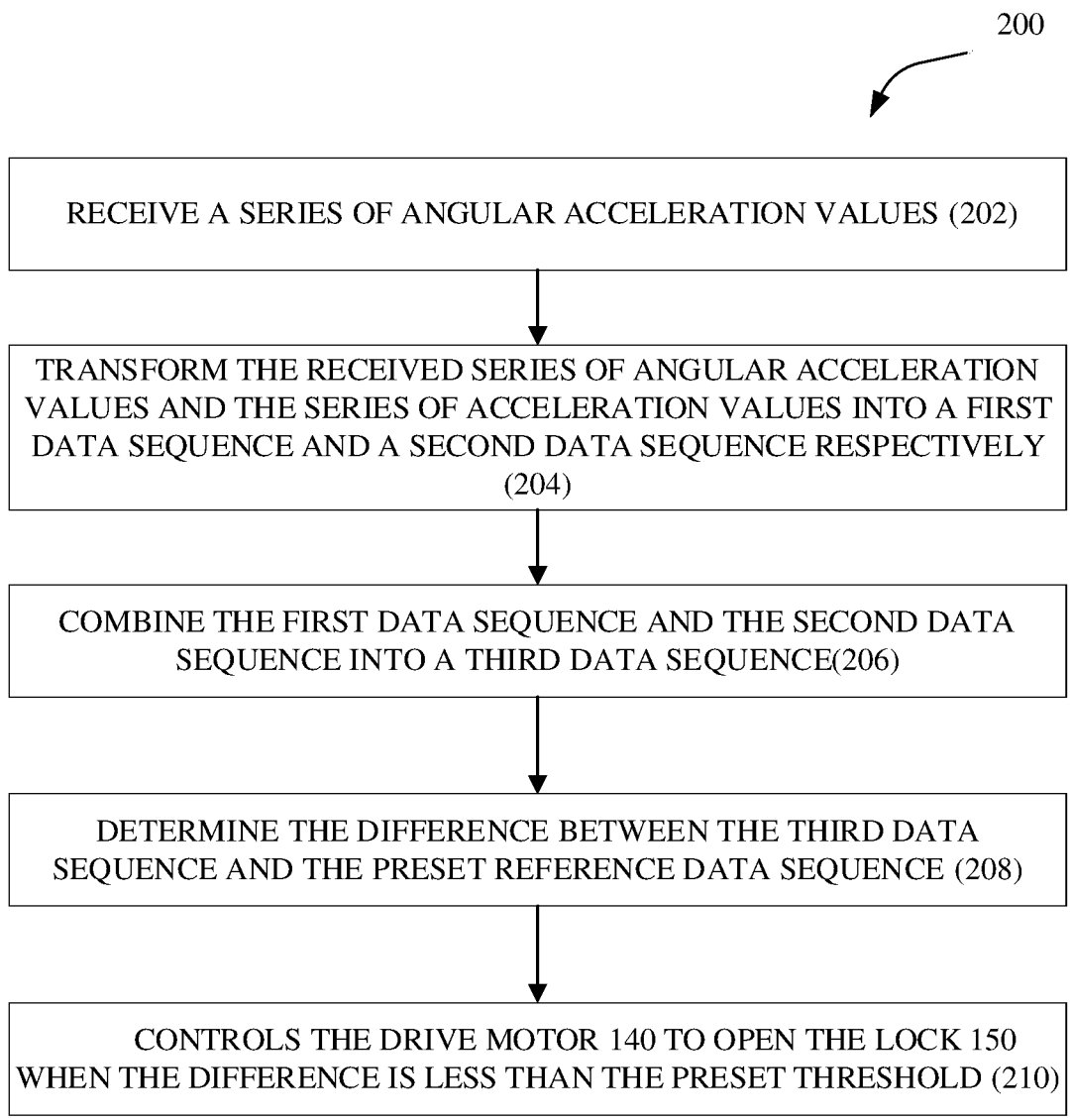
FIG. 2 shows a flowchart of a method of controlling a lock according to an embodiment of the present disclosure.

FIG. 2 shows a flowchart of a method 200 for controlling a lock according to an embodiment of the present disclosure. It should be understood that method 200 may also include additional steps not shown and/or illustrated actions may be omitted, and the scope of the present disclosure is not limited in this respect.

At 202, the processor 130 receives a series of angular acceleration values detected by the angular acceleration sensor 110 in response to the movement of the user's hand and a series of acceleration values detected by the angular acceleration sensor 120 in response to the movement of the user's hand. The movements of the user's hands are detected.

At 204, the processor 130 transforms the received series of angular acceleration values and the series of acceleration values into a first data sequence and a second data sequence respectively.

At 206, processor 130 combines the first data sequence and the second data sequence into a third data sequence.

At 208, the processor 130 determines the difference between the third data sequence and the preset reference data sequence.

At 210, the processor 130 controls the drive motor 140 to open the lock 150 when the difference is less than the preset threshold.

The solution of the present disclosure utilizes human body gestures in the password setting stage and the password using stage, which not only improves the intelligence of the door lock, but also improves the security of the door lock.

The disclosure may be a method, system and/or computer program product. A computer program product may include a computer-readable storage medium having thereon computer-readable program instructions for performing various aspects of the present disclosure.

Computer-readable storage media may be tangible devices that can retain and store instructions for use by an instruction execution device. The computer-readable storage medium may be, for example, but not limited to, an electrical storage device, a magnetic storage device, an optical storage device, an electromagnetic storage device, a semiconductor storage device, or any suitable combination of the above. More specific examples (non-exhaustive list) of computer readable storage media include: portable computer disks, hard disks, random access memory (RAM), read only memory (ROM), erasable programmable read only memory (EPROM or flash memory), flash media SSD, PCM SSD, 3D cross memory (3DXPoint), static random access memory (SRAM), portable compact disk read-only memory (CD-ROM), digital versatile disk (DVD), memory Sticks, floppy disks, mechanical encoding devices, such as punched cards or raised structures in grooves with instructions stored thereon, and any suitable combination of the above. As used herein, computer-readable storage media are not to be construed as transient signals per se, such as radio waves or other freely propagating electromagnetic waves, electromagnetic waves propagating through waveguides or other transmission media (e.g., light pulses through fiber optic cables), or through electrical wires. transmitted electrical signals.

Computer-readable program instructions described herein may be downloaded from a computer-readable storage medium to various computing/processing devices, or to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage on a computer-readable storage medium in the respective computing/processing device.

Computer program instructions for performing operations of the present disclosure may be assembly instructions, instruction set architecture (ISA) instructions, machine instructions, machine-related instructions, microcode, firmware instructions, state setting data, or instructions in one or more programming languages. Source code or object code written in any combination of programming languages including object-oriented programming languages-such as Smalltalk, C++, etc., and conventional procedural programming languages-such as the "C" language or similar programming languages. The computer-readable program instructions may execute entirely on the user's computer, partly on the user's computer, as a stand-alone software package, partly on the user's computer and partly on a remote computer or entirely on the remote computer or server implement. In situations involving remote computers, the remote computer can be connected to the user's computer through any kind of network, including a local area network (LAN) or a wide area network (WAN), or it can be connected to an external computer (such as an Internet service provider through the Internet). connect). In some embodiments, by utilizing state information of computer-readable program instructions to personalize an electronic circuit, such as a programmable logic circuit, a field programmable gate array (FPGA), or a programmable logic array (PLA), the electronic circuit can Computer readable program instructions are executed to implement various aspects of the disclosure.

The invention claimed is:

1. A lock system based on gesture detection, characterized in that the lock system includes an angular acceleration sensor, an acceleration sensor, a processor, a drive motor, and a lock, characterized in that:
    in response to a movement of a user's hand, the angular acceleration sensor detects a series of angular acceleration values;
    in response to the movement of the user's hand, the acceleration sensor detects a series of acceleration values;
    the processor receives the series of angular acceleration values and the series of acceleration values;
    the processor converts the received series of angular acceleration values and the series of acceleration values into a first data sequence and a second data sequence respectively;
    the processor combines the first data sequence and the second data sequence into a third data sequence;
    the processor determines a difference between the third data sequence and a preset reference data sequence;
    when the difference is less than a preset threshold, the processor controls the drive motor to open the lock.

2. The lock system according to claim 1, wherein the angular acceleration sensor is a gyroscope, and the acceleration sensor is a three-dimensional accelerometer.

3. The lock system of claim 1, wherein the processor determines the difference between the third data sequence and a preset reference data sequence including calculating the third data sequence and the reference data sequence; the variance between data series.

4. The lock system according to claim 3, wherein when the variance is less than a preset variance threshold, the processor controls the drive motor to open the lock.

5. The lock system according to claim 1, characterized in that the lock system further includes a human-computer interaction interface.

6. The lock system according to claim 1, characterized in that the reference data sequence is obtained in the following manner:
    in response to the movement of the user's hand, the angular acceleration sensor detects a first series of angular acceleration values;
    in response to the movement of the user's hand, the acceleration sensor detects a first series of acceleration values;
    the processor receives the first series of angular acceleration values and the first series of acceleration values;
    the processor converts the received first series of angular acceleration values and the first series of acceleration values into a fourth data sequence and a fifth data sequence respectively;
    the processor combines the fourth data sequence and the fifth data sequence into the reference data sequence.

7. A method of controlling a lock based on gesture detection, characterized in that the method includes:
    receiving a series of angular acceleration values detected by an angular acceleration sensor in response to a movement of a user's hand and a series of acceleration values detected by an acceleration sensor in response to the movement of the user's hand;
    converting the received series of angular acceleration values and the series of acceleration values into a first data sequence and a second data sequence respectively;
    combining the first data sequence and the second data sequence into a third data sequence;
    determine a difference between the third data sequence and a preset reference data sequence;
    when the difference is less than a preset threshold, a drive motor is controlled to open the lock.

8. A computer program product tangibly stored on a non-transitory computer-readable medium and comprising machine-executable instructions that, when executed, cause the machine to perform the method described in claim 7.

* * * * *